(12) United States Patent
Linke et al.

(10) Patent No.: US 6,350,307 B1
(45) Date of Patent: Feb. 26, 2002

(54) METAL COMPLEX PIGMENTS

(75) Inventors: Frank Linke, Köln; Kent Faubion, Leverkusen; Udo Herrmann, Dormagen; Richard Sommer, Odenthal, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/415,342

(22) Filed: Oct. 8, 1999

(30) Foreign Application Priority Data

Oct. 15, 1998 (DE) .......... 198 47 586
May 29, 1999 (DE) .......... 199 24 763

(51) Int. Cl.$^7$ .......... C09B 45/14; C09B 67/00; C09B 63/00; C08K 5/3462
(52) U.S. Cl. .......... 106/496; 534/602; 534/707
(58) Field of Search .......... 106/496; 534/707, 534/602

(56) References Cited

U.S. PATENT DOCUMENTS

| | | | |
|---|---|---|---|
| 3,869,439 A | 3/1975 | Schundehutte | 260/146 D |
| 4,622,391 A | 11/1986 | Lorenz et al. | 534/707 |
| 4,628,082 A | 12/1986 | Lorenz et al. | 534/707 |
| 5,221,334 A | 6/1993 | Ma et al. | 106/20 D |
| 5,519,085 A | 5/1996 | Ma et al. | 524/503 |

FOREIGN PATENT DOCUMENTS

| | | |
|---|---|---|
| DE | 195 35 246 | 3/1997 |
| DE | 197 12 486 | 10/1998 |
| DE | 198 47 586 | 4/2000 |

OTHER PUBLICATIONS

Bayer Farben Revue, 3/2 D, Sonderheft (Month unavailable), 1986, pp. 12–14, "Maβzahlen zur Beschreibung von Farben und Farbunterschieden".

K. Lindner, Tenside–Textihilfsmittel Waschrostoffe, 2$^{nd}$ Edition, vol. 1, Wissenschaftliche Verlagsgesellschaft mbH, Stuttgart, (Table of Contents attached only) (No Date).

*Primary Examiner*—Anthony Green
(74) *Attorney, Agent, or Firm*—Joseph C. Gil; Richard E. L. Henderson

(57) ABSTRACT

Metal complexes of an azo compound which conforms to the formula (I) or one of its tautomeric structures

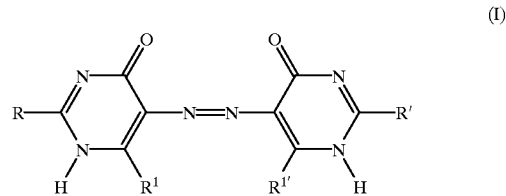

(I)

wherein

R and R' are independently OH, $NH_2$, NH—CN, acylamino or arylamino, $R_1$ and $R_{1'}$ are independently —OH or —$NH_2$, and which contain at least one guest compound, characterized in that the metal complexes correspond to the mono-, di-, tri- and tetrainions of the azo compounds of the formula (I) with the metals selected from the group consisting of Ca, Zn, Cu, Fe, Co, Sr, Ba, Cr, Sn, Al, Mg, Cd, Pb and La.

13 Claims, No Drawings

METAL COMPLEX PIGMENTS

This invention relates to new metal complex pigments, processes for producing them and their use.

EP-A-73 463 discloses coloristically valuable pigments. These still have application disadvantages, however. In particular, strong lightfast red pigments are not disclosed therein.

It is accordingly an object of the present invention to provide new pigments which are free of the above-described disadvantages.

The invention accordingly provides metal complexes of an azo compound which conforms to the formula (I) or one of its tautomeric structures

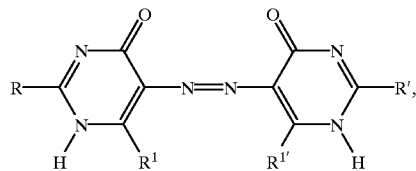
(I)

wherein

R and R' are independently OH, $NH_2$, NH—CN, arylamino or acylamino, $R^1$ and $R^{1'}$ are independently —H or —$NH_2$, and which contain at least one guest compound, characterized in that the metal complexes correspond to the mono-, di-, tri- and tetraanions of the azo compounds of the formula (I) with the metals selected from the group consisting of Ca, Zn, Cu, Fe, Co, Sr, Ba, Cr, Sn, Al, Mg, Cd, Pb and La.

Aryl substituents in the formula (I) are preferably phenyl or naphthyl, which may each be substituted for example by halogen such as F, Cl, Br, —OH, $C_1$–$C_6$-alkyl, $C_1$–$C_6$-alkoxy, —$NH_2$, —$NO_2$ and —CN.

Acyl substituents in the formula (I) are preferably ($C_1$–$C_6$-alkyl)-carbonyl, phenylcarbonyl, $C_1$–$C_6$-alkylsulphonyl, phenylsulphonyl, optionally $C_1$–$C_6$-alkyl-, phenyl- and naphthyl-substituted carbamoyl, optionally $C_1$–$C_6$-alkyl-, phenyl- and naphthyl-substituted sulphamoyl or optionally $C_1$–$C_6$-alkyl-, phenyl- or naphthyl-substituted guanyl, where the alkyl radicals mentioned may be substituted for example by halogen such as Cl, Br, F, —H, —CN, —$NH_2$ or $C_1$–$C_6$-alkoxy and the phenyl and naphthyl radicals mentioned may be substituted for example by halogen such as F, Cl, Br, —H, $C_1$–$C_6$-alkyl, $C_1$–$C_6$-alkoxy, —$NH_2$, —$NO_2$ and —CN.

The term "metal complexes" is herein also to be understood as meaning metal salts.

Very particularly preferred metal complexes are those of azo compounds of the formula (I) which in the form of their free acid conform to one of its tautomeric structures of the formula (II)

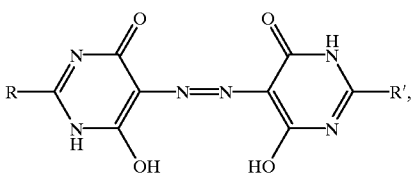
(II)

where

R and R' are independently selected from the group consisting of OH and NHCN, and include at least one other compound.

Preference is given here in particular to organic metal complexes of those azo compounds of the formula (II) which in the form of their free acid correspond to one of the tautomeric structures of the formulae (IIa to IIc)

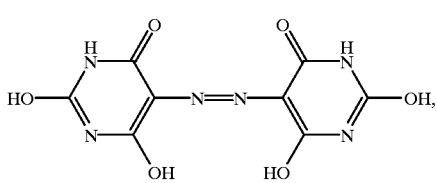
(IIa)

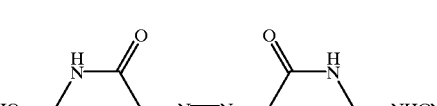
(IIb)

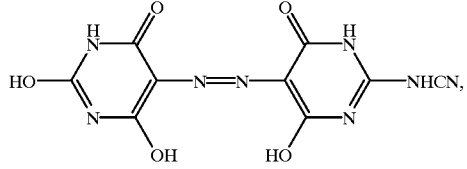

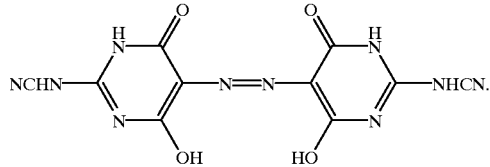
(IIc)

Particularly preferably, the compounds of the formula (I) are the 1:1 azo metal complexes which conform to the formula (Ia) or one of its tautomeric forms

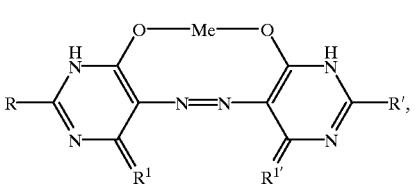
(Ia)

wherein

Me corresponds to one of the above-mentioned metal centres,

R and R' are each as defined above, and $R^1$ and $R^{1'}$ are independently=O or —NH.

In general, the metal complex compound forms a layered crystal lattice in which the bonding within a layer is essentially via hydrogen bonds and/or metal ions. Preferably, the metal complex compounds are metal compounds which form a crystal lattice which consists of essentially planar layers.

The metal complexes hosting other guest compounds can be present in the form of inclusion compounds, intercalation compounds and also as solid solutions.

Useful metal complexes also include metal complexes in which a metal-containing compound, for example a salt or metal complex, is incorporated into the crystal lattice of the metal complex. In this case, in the formula (I), a portion of the metal may be replaced by other metal ions, or further metal ions can enter into a more or less pronounced interaction with the metal complex.

Included compounds may be organic compounds and inorganic compounds. Compounds which can be included come from a very wide variety of classes of compounds. For purely practical reasons, preference is given to such compounds as are liquid or solid under normal conditions (25° C., 1 bar).

Of the liquid substances, preference is given in turn to those which have a boiling point (1 bar) of 100° C. or higher, preferably of 150° C. and higher. Suitable compounds are preferably acyclic and cyclic organic compounds, for example aliphatic and aromatic hydrocarbons, which may be substituted. for example by OH, COOH, $NH_2$, substituted $NH_2$, $CONH_2$, substituted $CONH_2$, $SO_2NH_2$, substituted $SO_2NH_2$, $SO_3H$, halogen, $NO_2$, CN, —$SO_2$-alkyl, —$SO_2$-aryl, —O-alkyl, —O-aryl, —O-acyl.

Aryl substituents are preferably phenyl or naphthyl, which may each be substituted for example by halogen such as F, Cl, Br, —H, $C_1$–$C_6$-alkyl, $C_1$–$C_6$-alkoxy, —$NH_2$, —NO and —CN.

Alkyl substituents are preferably $C_1$–$C_6$-alkyl, which may be substituted for example by halogen, such as chlorine, bromine, fluorine, —OH, —CN, —$NH_2$ or $C_1$–$C_6$-alkoxy.

Cycloalkyl substituents are preferably $C_3$–$C_7$-cycloalkyl, especially $C_5$–$C_6$-cycloalkyl, which may be substituted for example by $C_1$–$C_6$-alkyl, $C_1$–$C_6$-alkoxy, halogen such as Cl, Br, F, $C_1$–$C_6$-alkoxy, —OH, —CN and $NH_2$.

Aralkyl substituents are preferably phenyl- or naphthyl-$C_1$–$C_4$-alkyl, which may be substituted in the aromatic radicals by halogen such as F, Cl, Br, —OH, $C_1$–$C_6$-alkyl, $C_1$–$C_6$-alkoxy, —$NH_2$, —$NO_2$ and —CN, for example.

Acyl substituents are preferably ($C_1$–$C_6$-alkyl)-carbonyl, phenylcarbonyl, $C_1$–$C_6$-alkylsulphonyl, phenylsulphonyl, optionally $C_1$–$C_6$-alkyl-, phenyl- and naphthyl-substituted carbamoyl, optionally $C_1$–$C_6$-alkyl-, phenyl- and naphthyl-substituted sulphamoyl or optionally $C_1$–$C_6$-alkyl-, phenyl- or naphthyl-substituted guanyl, where the alkyl radicals mentioned may be substituted for example by halogen such as Cl, Br, F, —OH, —CN, —$NH_2$ or $C_1$–$C_6$-alkoxy and the phenyl and naphthyl radicals mentioned may be substituted for example by halogen such as F, Cl, Br, —OH, $C_1$–$C_6$-alkyl, $C_1$–$C_6$-alkoxy, —$NH_2$, —$NO_2$ and —CN.

Specific examples are paraffins and paraffin oils; triisobutylene, tetraisobutylene, mixtures of aliphatic and aromatic hydrocarbons as produced in petroleum fractionation for example; chlorinated paraffin hydrocarbons such as dodecyl chloride or stearyl chloride; $C_{10}$–$C_{30}$-alcohols such as 1-decanol, 1-dodecanol, 1-hexadecanol, 1-octadecanol and their mixtures, olein alcohol, 1,12-octadecanediol, fatty acids and their salts and mixtures, for example formic acid, acetic acid, dodecanoic acid, hexadecanoic acid, octadecanoic acid, oleic acid, fatty acid esters, for example the methyl esters of $C_{10}$–$C_{20}$-fatty acids, fatty acid amides, such as stearamide, stearic acid monoethanolamine, stearic acid diethanolamide, stearonitrile, fatty amines, for example dodecylamine, cetylamine, hexadecylamine, octadecylamine and others; salts of fatty amines with sulphonic and carboxylic acids, isocyclic hydrocarbons such as cyclododecane, decahydronaphthalene, o-, m-, p-xylene, mesitylene, dodecylbenzene mixture, tetralin, naphthalene, 1-methylnaphthalene, 2-methylnaphthalene, biphenyl, diphenylmethane, acenaphthene, fluorene, anthracene, phenanthrene, m-, p-terphenyl, o-, p-dichlorobenzene, nitrobenzene, 1-chloronaphthalene, 2-chloronaphthalene, 1-nitronaphthalene, isocyclic alcohols and phenols and their derivatives such as benzyl alcohol, decahydro-2-naphthol, diphenyl ether, sulphones, for example diphenyl sulphone, methyl phenyl sulphone, 4,4'-bis-2-(hydroxyethoxy) diphenyl sulphone; isocyclic carboxylic acids and their derivatives such as be,nzoic acid, 3-nitrobenzoic acid, cinnamic acid, 1-naphthalenecarboxylic acid, phthalic acid, dibutyl phthalate, dioctyl phthalate, tetrachlorophthalic acid, 2-nitrobenzamide, 3-nitrobenzamide, 4-nitrobenzamide, 4-chlorobenzamide, sulphonic acids, such as 2,5-dichlorobenzenesulphonic acid, 3-nitro-, 4-nitrobenzenesulphonic acid, 2,4-dimethylbenzenesulphollic acid, 1- and 2-naphthalenesulphonic acid, 5-nitro-1- and 5-nitro-2-naphthalenesulphonic acid, di-sec-butylnaphthalenesulphonic acid mixture, biphenyl-4-sulphonic acid, 1,4-, 1,5-, 2,6-, 2,7-naphthalenedisulphonic acid, 3-nitro-1,5-naphthalenedisulphonic acid, 1-anthraquinonesulphonic acid, 2-anthraquinonesulphonic acid, biphenyl-4,4'-disulphonic acid, 1,3,6-naphlhalenetrisulphonic acid and the salts of these sulphonic acids e.g. the sodium, potassium, calcium, zinc, nickel and copper salts; sulphonamides such as benzenesulphonamide, 2-, 3- and 4-nitrobenzenesulphonamide, 2-, 3- and 4-chlorobenzenesulphonamide, 4-methoxybenzeniesulphonamide, 3,3'-sulphonylbisbenzenesulphonamide, 4,4'-oxybisbenzenesulphonamide, 1- and 2-naphthalenesulphonic.

Carboxamides and sulphonamides are a preferred group of compounds to be included, also suitable in particular are urea and substituted ureas such as phenylurea, dodecylurea and others and also their polycondensates with aldehydes, especially formaldehyde; heterocycles such as barbituric acid, benzimidazolone, 5-benzimidazolonesulphonic acid, 2,3-dihydroxyquinoxaline, 2,3-dihydroxyquinoxaline-6-sulphonic acid, carbazole, carbazole-3,6-disulphonic acid, 2-hydroxyquinoline, 2,4-dihydroxyquinoline, caprolactam, melamine, 6-phenyl-1,3,5-triazine-2,4-diamine, 6-methyl-1, 3,5-triazine-2,4-diamine, cyanuric acid.

Preferred metal complexes contain included surface-active compounds, especially surfactants, which are known for example from K. Lindner, Tenside-Textilhilfsmittel-Waschrohstoffe, $2^{nd}$ edition, Volume I, Wissenschaftliche Verlagsgesellschaft mbH, Stuttgart, 1964. They can be anionic, non-ionic or cationic compounds or ampholytes. Examples of suitable anionic compounds are true soaps, salts of aminocarboxylic acids, salts of lower or higher acylated aminocarboxylic acids, fatty acid sulphates, sulphates of fatty acid esters, amides etc., primary alkyl sulphates, sulphates of oxo alcohols, secondary alkyl sulphates, sulphates of esterified or etherified polyoxy compounds, sulphates of substituted polyglycol ethers (sulphated ethylene oxide adducts), sulphates of acylated or alkylated alkanolamines, sulphonates of fatty acids, their esters, amides, etc., primary alkyl sulphonates, secondary alkyl sulphonates, alkyl sulphonates with acyls attached in ester fashion, alkyl or alkylphenyl ether sulphonates, sulphonates of polycarboxylic esters, alkylbenzenesulphonates, alkylnaphthalenesulphonates, fatty aromatic sulphonates, alkylbenzimidazolesulphonates, phosphates, polyphosphates, phosphonates, phosphinates, thiosulphates, hydrosulphites, sulphinates, persulphates. Examples of suitable non-ionic compounds are esters and ethers of polyalcohols, alkyl polyglycol ethers, acyl polyglycol ethers, alkylaryl polyglycol ethers, acylated and alkylated alkanolamine polyglycol ethers. Examples of suitable cationic compounds are alkylamine salts, quaternary ammonium salts, alkylpyridinium salts, simple and quaternary imidazoline salts, alkyldiamines and alkylpolyamines, acyldiamines and acylpolyamines, acylalkanolamines, alkanolamine esters, alkyl-$OCH_2$—N-pyridinium salts, alkyl-CO—NH—$CH_2$—N-pyridinium salts, alkylethyleneureas, sulphonium compounds, phosphonium compounds, arsenium compounds, alkylguanidines, acylbiguanidides. Examples of suitable ampholytes are alkylbetaines, sulphobetaines and aminocarboxylic acids. Preference is given to using non-ionic surfactants, especially the ethylene oxide addition products of fatty alcohols, fatty amines and also of octyl- or nonylphenol.

A further important group of guest compounds are natural resins and resin acids such as for example abietic acid and its conversion products and salts. Examples of such conversion products are hydrogenated, dehydrogenated and disproportionated abietic acids. These can further be dimerized, polymerized or modified by addition of maleic anhydride and fumaric acid. Also of interest are the resin acids modified at the carboxyl group such as for example the methyl, hydroxyethyl, glycol, glyceryl and pentaerythritol esters and also resin acid nitrites and resin acid amines and also dehydroabietyl alcohol.

Also suitable for inclusion are polymers, preferably water-soluble polymers, for example ethylene-propylene oxide block polymers, preferably having an $M_n$ not less than 1000, especially of 1000 to 10,000 g/mol, polyvinyl alcohol, poly(meth)-acrylic acids, modified cellulose, such as carboxymethylcelluloses, hydroxyethyl- and —propylcelluloses, methyl- and ethyl-hydroxyethylcelluloses.

Other suitable guest compounds are condensation products based on

A) sulphonated aromatics,

B) aldehydes and/or ketones and optionally

C) one or more compounds selected from the group of the non-sulphonated aromatics, urea and urea derivatives.

Based on means that the condensation product was optionally prepared from other reactants besides A, B and optionally C. Preferably, however, the condensation products for the purposes of this invention are prepared only from A, B and optionally C.

The sulphonated aromatics of component A) will be understood in the context of this invention as including sulphomethylated aromatics as well. Preferred sulphonated aromatics are naphthalenesulphonic acids, phenolsulphonic acids, dihydroxybenzenesulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl or benzenesulphonic acids.

Aldehydes and/or ketones useful as component B) include in particular aliphatic, cycloaliphatic and also aromatic ones. Preference is given to aliphatic aldehydes, particularly preferably formaldehyde and other aliphatic aldehydes of 3 to 5 carbon atoms.

Examples of non-sulphonated aromatics useful as component C) are phenol, cresol, 4,4'-dihydroxydiphenyl sulphone and dihydroxydiphenylmethane.

Examples of urea derivatives are dimethylolurea, alkylureas, melamine and guanidine.

Preference is given to a condensation product based on

A) at least one sulphonated aromatic selected from the group consisting of naphthalenesulphonic acids, phenolsulphonic acids, dihydroxybenzenesulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl and benzenesulphonic acids, B) formaldehyde and optionally C) one or more compounds selected from the group consisting of phenol, cresol, 4,4'-dihydroxydiphenyl sulphone, dihydroxydiphenylmethane, urea, dimethylolurea, melamine and guanidine.

Preferred condensation products are condensation products based on 4,4'-dihydroxydiphenyl sulphone, sulphonated ditolyl ether and formaldehyde; 4,4'-dihydroxydiphenyl sulphone, phenolsulphonic acid and formaldehyde; 4,4'-dihydroxydiphenyl sulphone, sodium bisulphite, formaldehyde and urea; naphthalenesulphonic acid, 4,4'-dihydroxydiphenyl sulphone and formaldehyde; sulphonated terphenyl and formaldehyde; and/or sulphonated 2-hydroxybiphenyl and formaldehyde and also naphthalenesulphonic acid and formaldehyde.

Particular preference for use as guest compounds is given to melamine or melamine derivatives, especially those of the formula (III)

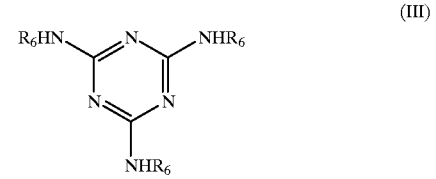

(III)

where $R_6$ is hydrogen or $C_1$–$C_4$-alkyl, which is optionally substituted by OH groups, very particularly preferably where $R_6$ is hydrogen.

The amount of substance which can be incorporated as guest compounds in the crystal lattice of the metal complex is generally 5% to 200% by weight, based on the amount of host compound. Preference is given to a guest compound amount of 10 to 100% by weight. The amount referred to here is the amount of substance which is not washed out by suitable solvents and which is obtained from the elemental analysis. Naturally, it is also possible to add more or less than the aforementioned amount of substance, and it may be optionally dispensed with to wash an excess out. Preference is given to amounts of 10 to 150% by weight.

The preferred inventive metal complexes of the azo compounds of the formula (I) which contain another compound as guest compound have a colour locus which is defined by the following ranges for the chromaticity coordinates x and y:

The colour loci are determined on alkyd-melamine varnishes according to DIN 53 238 in which the pigments are present in a completely dispersed state.

x=0.38 to 0.72, preferably 0.4 to 0.7 y=0.14 to 0.36, preferably 0.17 to 0.35 where $$x = \frac{X}{X+Y+Z} \qquad y = \frac{Y}{X+Y+Z},$$

where

X, Y and Z are tristimulus values.

The standardized colour system is described in Bayer Farben Revue, Sonderheft 3/2 D, 1986; p. 12–14.

Inclusion compounds, intercalation compounds and solid solutions of metal complexes per se are known from the literature. They and their preparation are described for example in EP 0 074 515 and EP 0 073 463.

The preparation of these compounds can be effected analogously to that described for example in EP 0 073 464. The invention further provides a process for preparing the inventive metal complexes, which is characterized in that the azo compound of the formula (I), preferably in the form of an alkali metal salt such as Na, Li or K salt, is reacted with a metal salt of metals selected from the group consisting of Ca, Zn, Cu, Fe, Co, Sr, Ba, Cr, Sn, Al, Mg, Cd, Pd and La, preferably at pH<7, and the resultant metal complex is reacted with the compound to be included as guest compound, preferably at a pH of 1 to 7. A preferred embodiment of the process of the invention is characterized in that, following the reaction with the guest compound, the pH is raised to 4.5 or higher, preferably to 4.5 to 7, if the reaction with the guest compound took place at pH of less than 4.5.

The metal salt is preferably selected from water-soluble metal salts of the abovementioned metals, especially chlorides, bromides, acetates, nitrates, etc. Preferred metal salts have a water solubility of more than 20 g/l, especially more than 50 g/l, at 20° C.

Suitable metal salts for preparing the salts and complexes of the azo compounds are for example magnesium chloride, magnesium sulphate, calcium chloride, calcium acetate, calcium formate, barium chloride, barium nitrate, barium acetate, barium carbonate, strontium nitrate, manganese chloride, manganese sulphate, iron(III) chloride, iron(III) nitrate, iron(II) sulphate, cobalt chloride, cobalt nitrate, cobalt sulphate, aluminium sulphate, aluminium nitrate, chromium(III) sulphate, chromium(III) nitrate, zinc chloride, zinc sulphate, zinc acetate, cadmium chloride, cadmium sulphate, cadmium nitrate, copper(II) sulphate, copper(II) chloride, copper(II) acetate and copper(II) formate, lanthanum nitrate and aluminium chloride hydrate.

It is also possible to use mixtures of these salts, which may also contain various ones of the metals mentioned. The use of such salt mixtures is especially advisable to obtain intermediate hues for the coloured end products.

The thusly obtained metal complexes according to the invention can then be isolated in the form of aqueous press cakes by filtration of their aqueous suspensions. These press cakes can be dried according to customary drying processes, for example after washing with hot water.

Useful drying processes include for example paddle drying or spray drying of appropriately aqueous slurries.

The pigment can subsequently be afterground.

If the metal complexes according to the invention are too harsh in texture, they can be converted into soft-textured pigments, for example by the method described in DE 19 847 586.

The aqueous press cake is preferably spray-dried as an aqueous slurry, the slurry preferably containing ammonia and/or an inorganic or organic base.

It is likewise preferable for the metal complexes of the invention, if they have a dispersing harshness of >250, to be heat-treated in the presence of water and optionally organic solvents either at a pH of 1 to 4, preferably 1 to 3, especially 1.5 to 2.5, or at a pH of 9 to 13, preferably 10 to 11, and at a temperature of 80 to 180° C., preferably 90 to 140° C., especially 95 to 110° C.

The heat treatment is preferably complete when the metal complex of the invention, which contains a guest compound, has a dispersing harshness of less than 250.

The invention therefore also provides for the inventive metal complexes having a dispersing harshness of less than 250 (measured on the lines of DIN 53 775 Part 7), the cold rolling temperature being 25° C. and the hot rolling temperature 150° C.

All the dispersing harshnesses reported herein were determined by this modified method.

The metal complexes of an azo compound of the formula (I) which contain at least one guest compound are herein referred to as pigments. The invention therefore also provides for pigment preparations comprising at least a pigment according to the invention and a dispersant.

Dispersants for the purposes of the present invention are substances which stabilize the pigment particles in their fine particulate form in aqueous media. Finely particulate is preferably understood as meaning a fine division of 0.001 to 5 µm, especially of 0.005 to 1 µm, particularly preferably of 0.005 to 0.5 µm.

The pigment preparations are preferably solid preparations, which are present in pulverulent or granular form.

Suitable dispersants are for example anionic, cationic, amphoteric or non-ionic.

Suitable anionic dispersants are in particular condensation products of aromatic sulphonic acids with formaldehyde, such as condensation products of formaldehyde and alkylnaphthalenesulphonic acids or of formaldehyde, naphthalenesulphonic acids and/or benzenesulphonic acids, condensation products of optionally substituted phenol with formaldehyde and sodium bisulphite. Also suitable are dispersants from the group of the sulphosuccinic esters and alkylbenzenesulphonates. Also sulphated, alkoxylated fatty acid alcohols or salts thereof. Alkoxylated fatty acid alcohols are to be understood as meaning in particular those $C_6$–$C_{22}$ fatty acid alcohols which are provided with 5 to 120, preferably 5 to 60, especially with 5 to 30, ethylene oxide and are saturated or unsaturated, especially stearyl alcohol. Particular preference is given to a stearyl alcohol alkoxylated with 8 to 10 ethylene oxide units. The sulphated alkoxylated fatty acid alcohols are preferably present as salts, especially as alkali metal or amine salts, preferably as diethylamine salt. Also suitable in particular are ligninsulphonates, for example those which are obtained by the sulphite or kraft process. Preferably they are products which are partially hydrolyzed, oxidized, propoxylated, sulphonated, sulphomethylated or desulphonated and fractionated according to known processes, for example according to the molecular weight or according to the degree of sulphonation. Mixtures of sulphite and kraft ligninsulphonates are likewise very effective. Of particular suitability are ligninsulphonates having an average molecular weight between 1000 and 100,000, an active ligninsulphonate content of not less than 80% and preferably a low level of polyvalent cations. The degree of sulphonation can vary widely.

Examples of useful non-ionic dispersants are reaction products of alkylene oxides with alkylatable compounds, for example fatty alcohols, fatty amines, fatty acids, phenols, alkylphenols, arylalkylphenols, such as styrene-phenol condensates, carboxamides and resin acids. They are for example ethylene oxide adducts from the class of the reaction products of ethylene oxide with:

a1) saturated and/or unsaturated fatty alcohols of 6 to 22 carbon atoms or b1) alkylphenols having 4 to 12 carbon atoms in the alkyl radical or c1) saturated and/or unsaturated fatty amines of 14 to 20 carbon atoms or d1) saturated and/or unsaturated fatty acids of 14 to 20 carbon atoms or e1) hydrogenated and/or unhydrogenated resin acids.

Suitable ethylene oxide adducts are in particular the alkylatable compounds mentioned under a1) to e1) when combined with 5 to 120, especially 5 to 100, especially 5 to 60, particularly preferably 5 to 30, mol of ethylene oxide.

Suitable dispersants also include the esters of the alkoxylation product of the formula (X) known from DE-A 19 712 486, which has an earlier priority date, or from DE-A 19 535 246, which conform to the formula (XI) and also these optionally mixed together with the parent compounds of the formula (X). The alkoxylation product of a styrene-phenol condensate of the formula (X) is as hereinbelow defined:

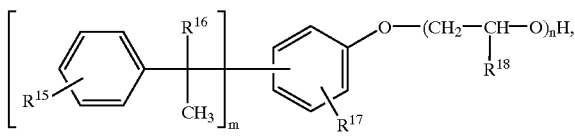
(X)

where $R^{15}$ is hydrogen or $C_1$–$C_4$-alkyl, $R^{16}$ is hydrogen or $CH_3$, $R^{17}$ is hydrogen, $C_1$–$C_4$-alkyl, $C_1$–$C_4$-alkoxy, $C_1$–$C_4$-alkoxycarbonyl or phenyl, m is from 1 to 4, n is from 6 to 120, $R^{18}$ is identical or different for each unit with the index n and represents hydrogen, $CH_3$ or phenyl subject to the proviso that, in the case of $CH_3$ being present in the various —(—$CH_2$—$CH(R^{18})$—O—) groups, $R^{18}$ is $CH_3$ in 0 to 60% of the total value of n and is hydrogen in 100 to 40% of the total value of n and in the case of phenyl being present in the various —(—$CH_2$—CH($R^{18}$)—O—) groups, $R^{18}$ is phenyl in 0 to 40% of the total value of n and is hydrogen in 100 to 60% of the total value of n.

Esters of alkoxylation products (X) conform to the formula (XI)

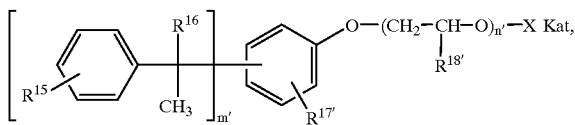
(XI)

where $R^{15'}$, $R^{16'}$, $R^{17'}$, $R^{18'}$, m' and n' assume the scope of meaning of $R^{15}$, $R^{16}$, $R^{17}$, $R^{18}$, m and n, respectively, but independently thereof, X is —$SO_3$, —$SO_2$, —$PO_3$ or —CO—($R^{19}$)—COO, Kat is a cation selected from the group consisting of $H^+$, $Li^+$, $Na^+$, $K^+$, $NH_4^+$ and HO—$CH_2CH_2$—$NH_3+$, subject to the proviso that in the case of X=—$PO_3^-$ two cations are present, and $R^{19}$ is a divalent aliphatic or aromatic radical, preferably $C_1$–$C_4$-alkylene, especially ethylene, monounsaturated $C_2$–$C_4$ radicals, especially acetylene, or optionally substituted phenylene, especially ortho-phenylene, preferred substituents being $C_1$–$C_4$-alkyl, $C_1$–$C_4$-alkoxy, $C_1$–$C_4$-alkoxycarbonyl or phenyl.

Specific individual compounds of the formula (XI) are known for example from DE-A-19 712 486 and mixtures of the formulae (X) and (XI) for example from DE-A-19 535 256, which each form part of this application.

A preferred dispersant is the compound of the formula (XI). Preferably a compound of the formula (XI) where X is a radical of the formula —CO—($R^{19}$)—COO— and $R^{19}$ is as defined above.

Preference for use as dispersant is likewise given to a compound of the formula (XI) used together with a compound of the formula (X). In this case, the dispersant preferably contains 5 to 99% by weight of the compound (XI) and 1 to 95% by weight of the compound (X).

Polymeric dispersants are for example water-soluble and also water-emulsifiable compounds, for example homo- and copolymers such as random or block copolymers.

Particularly preferred polymeric dispersants are for example AB, BAB and ABC block copolymers. In the AB or BAB block copolymers, the A segment is a hydrophobic homopolymer or copolymer which provides a bond to the pigment and the B block is a hydrophilic homopolymer or copolymer or a salt thereof and ensures dispersal of the pigment in an aqueous medium. Such polymeric dispersants and their synthesis are known for example from EP-A-518 225 and EP-A-556 649.

The dispersant is preferably used in an amount of 0.1 to 100% by weight, especially 0.5 to 60% by weight, based on the use level of pigment in the pigment preparation.

The preparation may contain further additives, of course. For instance, additives which reduce the viscosity of an aqueous suspension and increase the solids content, such as the abovementioned carboxamides and sulphonamides, can be added in an amount of up to 10% by weight, based on the preparation.

Examples of further additives are inorganic and organic bases and also additives customary for pigment preparation.

Suitable bases are alkali metal hydroxides, for example NaOH or KOH, organic amines such as alkylamines, especially alkanolamines or alkylalkanolamines.

Particular preference is given to methylamine, dimethylamine, trimethylamine, ethanolamine, n-propanolamine, n-butanolamine, diethanolamine, triethanolamine, methylethanolamine or dimethylethanolamine.

Examples of suitable carboxamides and sulphonamides are urea and substituted ureas such as phenylurea, dodecylurea and others; heterocycles such as barbituric acid, benzimidazolone, benzimidazolone-5-sulphonic acid, 2,3-dihydroxyquinoxaline, 2,3-dihydroxyquinoxaline-6-sulphonic acid, carbazole, carbazole-3,6-disulphonic acid, 2-hydroxyquinoline, 2,4-dihydroxyquinoline, caprolactam, melamine, 6-phenyl-1,3,5-triazine-2,4-diamine, 6-methyl-1,3,5-triazine-2,4-diamine, cyanuric acid.

The base is optionally present in up to an amount of 20% by weight, preferably up to 10% by weight, based on the pigment.

But it is particularly preferable for the preparation of the invention to contain more than 90%, especially more than 95%, preferably more than 97%, by weight of pigment according to the invention, dispersant and optionally base.

The invention further provides a process for preparing the pigment preparation of the invention, characterized in that pigment and dispersant and optionally further additives are mixed.

The metal complexes of the invention are very useful for all pigment applications. They are useful for example for pigmenting varnishes of all kinds for the production of printing colours, distemper colours or binder colours, for the mass coloration of synthetic, semisynthetic or natural macromolecular substances, especially polyvinyl chloride, polystyrene, polyamide, polyethylene or polypropylene. They are also useful for the spin-dyeing of natural, regenerated or artificial fibres, for example cellulose, polyester, polycarbonate, polyacrylonitrile or polyamide fibres, and also for printing textiles and paper. These pigments provide finely divided, stable, aqueous pigmentations of emulsion and paint colours which are useful for paper coloration, for the pigment printing of textiles, for laminating and also for the spin-dyeing of viscose, by grinding or kneading in the presence of non-ionic, anionic or cationic surfactants.

EXAMPLES

Example 1

425 g of water-moist paste of an azobarbituric sodium salt compound having a solids content of 40%, corresponding to 170 g in the dry state, are homogeneously suspended in 5000 ml of distilled water using a laboratory stirrer, heated to 95° C., admixed with 61.1 g of $CaCl_2$ and stirred at 95° C. for 2 h. 63.1 g of melamine are then added and stirred in at 95° C. for 1 h. The pH is then adjusted to 5.0 with sodium hydroxide solution. The product is then isolated by suction filtration, dried at 80° C. in a vacuum drying cabinet and ground for about 2 minutes in a customary laboratory mill.

The thusly obtained pigment powder is dispersed according to DIN 53 238 in an alkyd-melamine varnish system.

| Colour locus: | X = 31.6 | Y = 20.9 | Z = 6.5 |
|---|---|---|---|

Example 2

Example 1 is repeated with the $CaCl_2$ being replaced by 57.3 g of $BaCl_2$. The pigment suspension thus obtained is isolated, dried and ground, each step being carried out as described in Example 1. The pigment powder thus obtained is then incorporated into an aqueous binder.

| Colour locus | X = 26 | Y = 17 | Z = 6 |
|---|---|---|---|

Example 3

485 g of water-moist paste of an azobarbituric sodium salt compound having a solids content of 35%, corresponding to 170 g in the dry state, are homogeneously suspended in 5000 ml of distilled water using a laboratory stirrer, heated to 95° C., admixed with 69.7 g of $FeCl_2$ and then stirred at 95° C. for 2 h. 129 g of melamine are then added and stirred in at 95° C. for 1 h. The pH is then adjusted to 5.0 with sodium hydroxide solution. The product is then isolated by suction filtration, dried at 80° C. in a vacuum drying cabinet and ground for about 2 minutes in a customary laboratory mill. Colour locus: X=8.81/Y=9.4/Z=9.81.

The thusly obtained pigment powder is dispersed according to DIN 53 238 in an alkyd-melamine varnish system.

| Colour locus: | X = 8.8 | Y = 9.4 | Z = 9.8 |
|---|---|---|---|

Example 4

425 g of water-moist paste of an azobarbituric sodium salt compound having a solids content of 40%, corresponding to 170 g in the dry state, are homogeneously suspended in 5000 ml of distilled water using a laboratory stirrer admixed with 100.8 g of $CdCl_2$ and 129 g of melamine, heated to 95° C., and stirred at 95° C. for 2 h. The pH is then adjusted to 5.0 with sodium hydroxide solution. The product is then isolated by suction filtration, dried at 80° C. in a vacuum drying cabinet and ground for about 2 minutes in a customary laboratory mill.

The thusly obtained pigment powder is dispersed according to DIN 53 238 in an alkyd-melamine varnish system.

| Colour locus: | X = 49.5 | Y = 38 | Z = 5.4 |
|---|---|---|---|

Example 5

Example 4 is repeated with the $CdCl_2$ being replaced by 104.3 g of $SnCl_2$. The pigment suspension thus obtained is isolated, dried and ground, each step being carried out as described in Example 1.

The thusly obtained pigment powder is dispersed according to DIN 53 238 in an alkyd-melamine varnish system.

| Colour locus: | X = 21.3 | Y = 16.4 | Z = 6.3 |
|---|---|---|---|

Example 6

485 g of water-moist paste of an azobarbituric sodium salt compound having a solids content of 35%, corresponding to 170 g in the dry state, are homogeneously suspended in 5000 ml of distilled water using a laboratory stirrer, heated to 95° C., admixed with 61.1 g of $CaCl_2$ and stirred at 95° C. for 2 h. 63.1 g of melamine and 60 g of Pluronic•738 (an ethylene oxide-propylene oxide polycondensate from BASF) are then added and stirred in at 95° C. for 1 hour. The pH is then adjusted to 5.0 with sodium hydroxide solution. The product is then isolated by suction filtration, dried at 80° C. in a vacuum drying cabinet and ground for about 2 minutes in a customary laboratory mill.

The thusly obtained pigment powder is incorporated into PVC by cold rolling on a roll mill.

| X = 68.97 | Y = 67.98 | Z = 30.08 |
|---|---|---|

Example 7

485 g of water-moist paste of an azobarbituric sodium salt compound having a solids content of 35%, corresponding to 170 g in the dry state, are homogeneously suspended in 5000 ml of distilled water using a laboratory stirrer, heated to 95° C., admixed with 61.1 g of $CaCl_2$ and stirred at 95° C. for 2 h. 120 g of Pluronic ≦738 (an ethylene oxide-propylene oxide polycondensate, molar mass about 2000 g/mol, from BASF) are then added and stirred in at 95° C. for 1 hour. The pH is then adjusted to 5.0 with sodium hydroxide solution. The product is then isolated by suction filtration, dried at 80° C. in a vacuum drying cabinet and ground for about 2 minutes in a customary laboratory mill.

The thusly obtained pigment powder is incorporated into PVC by cold rolling on a roll mill.

| X = 58.6 | Y = 56.6 | Z = 22.9 |
|---|---|---|

Example 8

485 g of water-moist paste of an azobarbituric sodium salt compound having a solids content of 35%, corresponding to 170 g in the dry state, are homogeneously suspended in 5000 ml of distilled water using a laboratory stirrer, heated to 95° C., admixed with 61.1 g of $CaCl_2$ and stirred at 95° C. for 2 h. 120 g of Tetronic ≦707 (an ethylenediamine-started ethylene oxide-propylene oxide block condensate from BASF) are then added and stirred in at 95° C. for 1 hour. The pH is then adjusted to 5.0 with sodium hydroxide solution. The product is then isolated by suction filtration, dried at 80° C. in a vacuum drying cabinet and ground for about 2 minutes in a customary laboratory mill.

The thusly obtained pigment powder is incorporated into PVC by cold rolling on a roll mill.

| Colour locus: | X = 61.8 | Y = 54.9 | Z = 31.43 |
|---|---|---|---|

Example 9

Example 1 is repeated with the $CaCl_2$ being replaced by 138.1 g of $Mn(NO_2)_2 \cdot 4H_2O$. The pigment suspension thus obtained is isolated, dried and ground, each step being carried out as described in Example 1.

The pigment powder thus obtained is then incorporated in an aqueous binder.

| Colour locus: | X = 46 | Y = 41 | Z = 27 |
|---|---|---|---|

Example 10

Example 1 is repeated with the $CaCl_2$ being replaced by 100.9 g of $Zn(CH_3COO)_2$. The pigment suspension thus obtained is isolated, dried and ground, each step being carried out as described in Example 1.

The pigment powder thus obtained is then dispersed according to DIN 53 238 in an alkyd-melamine varnish system.

| Colour locus: | X = 31.1 | Y = 21.3 | Z = 6 |
|---|---|---|---|

Example 11

Example 3 is repeated with the FeCl7 being replaced by 133 g of $AlCl_3 \cdot 6H_2O$. The pigment suspension thus obtained is isolated, dried and ground, each step being carried out as described in Example 3.

The pigment powder thus obtained is then incorporated into an aqueous binder.

The binder is drawn down, dried and measured with a commercially available calorimeter to determine the colour locus.

| Colour locus: | X = 62 | Y = 52 | Z = 9 |
|---|---|---|---|

Example 12

Example 3 is repeated with the $FeCl_2$ being replaced by 146.5 g of $CrCl_3 \cdot 6H_2O$. The pigment suspension thus obtained is isolated, dried and ground, each step being carried out as described in Example 3.

The pigment powder thus obtained is then processed by means of an extruder into a PP fibre.

| Colour locus: | X = 64.5 | Y = 62.1 | Z = 40.15 |
|---|---|---|---|

Example 13

Example 1 is repeated with the $CaCl_2$ being replaced by 101.7 g of $MgCl_2 \cdot 6H_2O$. The pigment suspension thus obtained is isolated, dried and ground, each step being carried out as described in Example 1.

The pigment powder thus obtained is then incorporated into PVC.

| Colour locus: | X = 72.4 | Y = 66 | Z = 56.15 |
|---|---|---|---|

Example 14

Example 1 is repeated with the $CaCl_2$ being replaced by 152.9 g of $PbCl_2$. The pigment suspension thus obtained is isolated, dried and ground, each step being carried out as described in Example 1.

The thusly obtained pigment powder is dispersed according to DIN 53 238 in an alkyd-melamine varnish system.

| Colour locus: | X = 40.6 | Y = 28.5 | Z = 5.8 |
|---|---|---|---|

Example 15

Example 1 is repeated with the $CaCl_2$ being replaced by 93.8 g of $CuCl_2 \cdot 2H_2O$. The pigment suspension thus obtained is isolated, dried and ground, each step being carried out as described in Example 1.

The thusly obtained pigment powder is dispersed according to DIN 53 238 in an alkyd-melamine varnish system.

| Colour locus: | X = 17.7 | Y = 15.21 | Z = 6.33 |
|---|---|---|---|

Example 16

Preparation of Cyaniminoazobarbituric Acid 4.9 mol of diazobarbituric acid (755 g) and 5.0 mol of cyaniminobarbituric acid are suspended in 10 l of $H_2O$ and heated to 80° C. On reaching a temperature of 80° C., the pH is adjusted to 5 with 30% NaOH and the suspension is stirred for 3 hours. The red product is filtered and washed with hot water (10 l).

The diazobarbituric acid of the formula

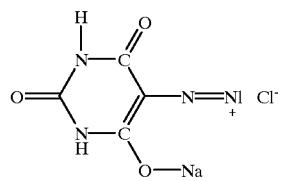

is prepared as follows.

Preparation of Guanyl Azide

An initial charge of technical grade hydrochloric acid and distilled and demineralized water is indirectly cooled down to about 0° C. Aminoguanidine bicarbonate is subsequently added at about 10° C. in the course of about 30 minutes. Thereafter, the batch is indirectly cooled down to about 0° C., and sodium nitrite solution is added up to max. 15° C. in the course of about 3 hours. This is followed by stirring with nitrite excess for 15 minutes. Directly prior to transfer of the azo groups, the nitrite excess is removed with amidosulphonic acid.

Azo Group Transfer

Solid barbituric acid is then introduced into the solution of guanyl azide. This is followed by indirect heating to about 70° C. and subsequent stirring at that temperature for 4 hours. The batch is then externally cooled down to 0° C. and pressed off.

Example 17

Preparation of Cyaniminoazobarbituric Acid 0.14 mol of the sodium salt of cyaniminoazobarbituric acid (47.8 g) is refluxed with 0.15 mol of $MnCl_2.4H_2O$ (30.6 g) in 300 ml of $H_2O$ for 2.5 hours. The pH of the dispersion is between 2 and 6, preferably between 3.5 and 5. After 2 hours, 0.28 mol (35.3 g) of melamine are added. The batch is buffered with sodium acetate to pH=4.5 and filtered, and the filter cake is washed with 1 l of hot water. The product is dried at 95° C. for 12 h and ground in a laboratory mill.

The pigment powder thus obtained is dispersed according to DIN 53 238 in an alkyd-melamine varnish system.

| Colour locus: | X = 12.7 | Y = 8.7 | Z = 5 |
|---|---|---|---|

Example 18

Example 16 is repeated using 0.15 mol of $SnCl_2.2H_2O$ (33.8 g) instead of the manganese chloride.

The pigment powder obtained is incorporated into an aqueous binder formulation.

| Colour locus: | X = 33.9 | Y = 24.1 | Z = 7.96 |
|---|---|---|---|

Example 19

Example 17 is repeated using 0.15 mol of $CuCl_2.2H_2O$ (25.6 g) instead of the manganese chloride. The pigment powder obtained after the working-up is rolled cold into PVC. 0.1 part of the pigment Bayertitan® R-FK-2 from Bayer AG are incorporated into 100 parts of the PVC.

| Colour locus: | X = 47.46 | Y = 46.23 | Z = 28.8 |
|---|---|---|---|

Example 20

Example 17 is repeated using 0.15 mol of $CoCl_2.2H_2O$ (35.65 g) instead of the manganese chloride. The pigment powder obtained after the working-up is incorporated in a melamine-alkyd varnish (DIN 53 238).

| Colour locus: | X = 26.2 | Y = 5.9 | Z = 5 |
|---|---|---|---|

Example 21

Example 17 is repeated using 0.15 mol of $AlCl_3$ (20 g) instead of the manganese chloride. The pigment powder obtained after the working-up is incorporated according to DIN 53 238 in a melamine-alkyd varnish.

| Colour locus: | X = 26.67 | Y = 17.3 | Z = 5.1 |
|---|---|---|---|

Example 22

Example 17 is repeated using 0.15 mol of $CrCl_3.6H_2O$ (40 g) instead of the manganese chloride. The pigment powder obtained after the working-up is incorporated into an aqueous binder.

| Colour locus: | X = 32.1 | Y = 24.05 | Z = 7.9 |
|---|---|---|---|

Example 23

Example 17 is repeated using 0.15 mol of $ZnCl_2$ (20.44 g) instead of the manganese chloride. The pigment powder obtained after the working-up is rolled into PVC analogously to Example 19.

| Colour locus: | X = 60 | Y = 55.3 | Z = 32.46 |
|---|---|---|---|

Example 24

Example 17 is repeated using 0.15 mol of $FeSO_4.H_2O$ (41.7 g) instead of the manganese chloride. The pigment powder obtained after the working-up is rolled into PVC analogously to Example 19.

| Colour locus: | X = 26.3 | Y = 26.38 | Z = 21.13 |
|---|---|---|---|

Example 25

Example 17 is repeated using 0.15 mol of $La(NO_3)_3$ (48.74 g) instead of the manganese chloride. The product obtained after the working-up is incorporated according to DIN 53 238 in a melamine-alkyd varnish.

| Colour locus: | X = 19.6 | Y = 12.6 | Z = 5.9 |
|---|---|---|---|

Example 26

Example 17 is repeated using 0.15 mol of $NoCl_2.6H_2O$ (35.64 g) instead of the manganese chloride. The product obtained after the working-up is incorporated According to DIN 53238 in a melamine-alkyd varnish.

| Colour locus: | X = 21.3 | Y = 16.8 | Z = 5.54 |
|---|---|---|---|

Example 27

Example 17 is repeated using 0.15 mol of $CaCl_2. 2H_2O$ (22.05 g) instead of the manganese chloride. The pigment powder obtained after the working-up is incorporated into an aqueous binder.

| Colour locus: | X = 44.6 | Y = 33.4 | Z = 8.6 |
|---|---|---|---|

Example 28

Example 17 is repeated using 0.15 mol of $MgCl_2.6H_2O$ (30.5 g) instead of the manganese chloride. The pigment powder obtained after the working-up is incorporated into an aqueous binder.

| Colour locus: | X = 43.3 | Y = 33.8 | Z = 9.74 |
|---|---|---|---|

Example 29
Preparation of the Sodium Salt of Dicyaniminoazobarbituric Acid

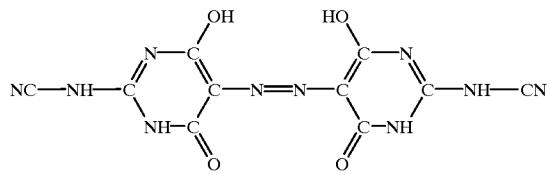

1.62 mol of HCl are precharged as 37% HCl with ice. 0.75 mol of aminobiguanidine carbonate is added in the course of 15 minutes. 0.75 mol of $NaNO_2$ in 37% solution is gradually added (60') with continuous cooling (at below 5° C.). Excess nitrite is destroyed by adding 30% amidosulphonic acid solution. The reaction volume is 6 l. 0.75 mol of cyaniminobarbituric acid is added and the reaction mixture is stirred at 50–80° C. for 3 to 5 hours, preferably at T≦65° C. for 3 to 4 hours. Cyaniminoazobarbituric acid is formed.

Another 0.75 mol of cyaniminobarbituric acid is then added to the reaction mixture.

A pH of 5 to 9, preferably 7 to 8.5, is set with 30% NaOH, before the batch is stirred at 95° C. for 2 hours.

The product is filtered off and washed with an equal volume of hot water at 80°.

Example 30

0.15mol of sodium dicyaniminoazobarbiturate and 0.15mol of $CaCl_2.2H_2O$ (20.05 g) are refluxed in 500 ml of water at pH 1 to 7, preferably at pH 3 to 5, for 2 hours. This is followed by the addition of 0.15 to 0.6 mol of melamine, preferably 0.15 to 0.4 mol, and an additional hour of refluxing. The reaction mixture is adjusted to pH 5 with sodium acetate, and the product is filtered off. The filter residue is washed with 1.5 l of hot water at 80° C. The filter cake is dried at 95° C. and 100 mbar for 12 h and ground in a laboratory mill.

The pigment powder thus obtained is incorporated according to DIN 53 238 in a melamine-alkyd varnish.

| Colour locus: | X = 13.8 | Y = 8.76 | Z = 5.1 |
|---|---|---|---|

Example 31

Example 30 is repeated using 0.15 mol of $BaCl_2.2H_2O$ (36.6 g) instead of the calcium chloride. The pigment powder obtained after the working-up is incorporated according to DIN 53 238 in a melamine-alkyd varnish.

| Colour locus: | X = 9.27 | Y = 7.6 | Z = 5.4 |
|---|---|---|---|

Example 32

Example 30 is repeated using 0.15 mol of $ZnCl_2$ (20.4 g) instead of the calcium chloride. The pigment powder obtained after the working-up is incorporated into an aqueous binder.

| Colour locus: | X = 36.8 | Y = 25.01 | Z = 8.21 |
|---|---|---|---|

Example 33

Example 30 is repeated using 0.15 mol of $MnCl_2.4H_2O$ (30.6 g) instead of the calcium chloride. The pigment powder obtained after the working-up is incorporated into an aqueous binder.

| Colour locus: | X = 23.9 | Y = 17.75 | Z = 10 |

Example 34

Example 30 is repeated using 0.15 mol of $MgCl_2 \cdot 6H_2O$ (30.5 g) instead of the calcium chloride. The pigment powder obtained after the working-up is incorporated according to DIN 53 238 in a melamine-alkyd varnish.

| Colour locus: | X = 7.78 | Y = 6.56 | Z = 5.2 |

Example 35

Example 30 is repeated using 0.15 mol of $AlCl_3$ (20 g) instead of the calcium chloride and neutralizing the resultant HCl until the desired reaction pH has been reached. The pigment powder obtained after the working-up is incorporated according to DIN 53 238 in a melamine-alkyd varnish.

| Colour locus: | X = 9.7 | Y = 7.5 | Z = 5.1 |

Example 36

Example 30 is repeated using 0.15 mol of $FeCl_2 \cdot 4H_2O$ (29.8 g) instead of the calcium chloride. The pigment powder obtained after the working-up is incorporated according to DIN 53 238 in a melamine-alkyd varnish.

| Colour locus: | X = 4.5 | Y = 4.7 | Z = 4.9 |

Example 37

0.14 mol of the sodium salt of cyaniminoazobarbituric acid (47.8) are refluxed with 0.15 mol of $MnCl_2 \cdot 4 H_2O$ in 300 ml of $H_2O$ for 3.0 h. The pH is maintained at 5. After 2 hours the pH is adjusted to 2.0 with concentrated HCl. 40 g of urea and 56 g of 37% formaldehyde are stirred in. On expiration of the third hour the batch is buffered to pH 4.5 with sodium acetate and filtered, and the filter residue is washed with 1 l of hot water.

The product is dried at 95° C. for 12 h and ground in a laboratory mill. The pigment powder thus obtained is dispersed according to DIN 53 238 in an alkyd-melamine varnish system.

| Colour locus: | X = 14.54 | Y = 10 | Z = 5.38 |

Example 38

Example 30 is repeated using 0.15 mol of $CrCl_3 \cdot 6H_2O$ (40 g) instead of the calcium chloride. The pigment powder obtained after the working-up is incorporated according to DIN 53 238 in a melamine-alkyd varnish.

| Colour locus: | X = 7.1 | Y = 6.1 | Z = 5 |

Example 39

Example 30 is repeated using 0.15 mol of $CoCl_2 \cdot 6H_2O$ (35.7 g) instead of the calcium chloride. The pigment powder obtained after the working-up is incorporated according to DIN 53 238 in a melamine-alkyd varnish.

| Colour locus: | X = 6.65 | Y = 6.16 | Z = 5.1 |

Example 40

Example 30 is repeated using 0.15 mol of $SnCl_2 \cdot 2H_2O$ (32.8 g) instead of the calcium chloride. The pigment powder obtained after the working-up is incorporated into an aqueous binder.

| Colour locus: | X = 46.4 | Y = 35.6 | Z = 9.8 |

Example 41

Example 30 is repeated using 0.15 mol of $CuCl_2 \cdot 2H_2O$ (25.6 g) instead of the calcium chloride. The pigment powder obtained after the working-up is incorporated according to DIN 53 238 in a melamine-alkyd varnish.

| Colour locus: | X = 5.7 | Y = 5.44 | Z = 5 |

Example 42

Example 30 is repeated using 0.15 mol of $LaNO_3 \cdot 2H_2O$ (25.6 g) instead of the calcium chloride. The pigment powder obtained after the working-up is incorporated according to DIN 53 238 in a melamine-alkyd varnish.

| Colour locus: | X = 16.3 | Y = 11 | Z = 5.2 |

Example 43
(Ba salt of cyaniminoazobarbituric acid)

Example 17 is repeated using 0.15 mol of $BaCl_2 \cdot 2H_2O$ (36.6 g) instead of the calcium chloride. The pigment powder obtained after the working-up is incorporated according to DIN 53 238 in a alkyd-melamine varnish.

| Colour locus: | X = 15.13 | Y = 10.39 | Z = 5.83 |

What is claimed is:
1. A metal complex pigment comprising
(a) a metal complex of
(1) a monoanion, dianion, trianion, or tetraanion of an azo compound conforming to formula (II)

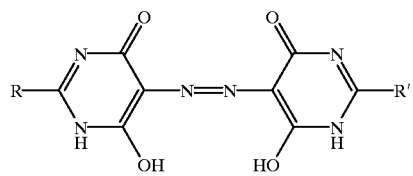
(II)

or a tautomeric form thereof,
wherein
R is OH or NH—CN, and
R' is NH—CN, and
(2) the metal La; and
(b) at least one guest compound.

2. A metal complex pigment according to claim 1 wherein the guest compound is a cyclic or acyclic organic compound.

3. A metal complex pigment according to claim 2 wherein the cyclic or acyclic organic compound is an aliphatic or aromatic hydrocarbon or an aliphatic or aromatic hydrocarbon substituted by one or more OH, COOH, $NH_2$ or substituted $NH_2$, $CONH_2$ or substituted $CONH_2$, $SO_2NH_2$ or substituted $SO_2NH_2$, $SO_3H$, halogen, $NO_2$, CN, —$SO_2$-alkyl, —$SO_2$-aryl, —O-alkyl, —O-aryl, or —O-acyl.

4. A metal complex pigment according to claim 1 wherein the guest compound is melamine or a melamine derivative, urea or a substituted urea, a polycondensate of urea or a substituted urea with an aldehyde, or an ethylene oxide-propylene oxide block copolymer.

5. A metal complex pigment according to claim 1 having a color locus defined by the chromaticity coordinates x ranging from 0.38 to 0.72 and y ranging from 0.14 to 0.36, as determined using an alkyl-melamine varnish according to DIN 53 238.

6. A metal complex pigment according to claim 1 having a dispersing hardness of less than 250.

7. A process for preparing a metal complex according to claim 1 comprising
(a) complexing an azo compound conforming to formula (II)

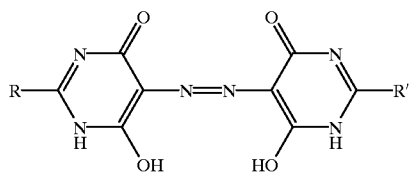
(II)

or a tautomeric form thereof,
wherein
R is OH or NH—CN, and
R' is NH—CN,
with the metal La or one or more salts thereof; and
(b) adding at least one guest compound to the resultant metal complex.

8. A pigment preparation comprising at least one metal complex pigment according to claim 1 and at least one dispersant.

9. A process for preparing a pigment preparation comprising mixing at least one metal complex pigment according to claim 1 and at least one dispersant.

10. A method for preparing printing colors, distemper colors, or binder colors comprising adding a metal complex pigment according to claim 1 to a varnish.

11. A method for mass coloring synthetic, semisynthetic, or natural macromolecular substances comprising introducing a metal complex pigment according to claim 1 into a synthetic, semisynthetic, or natural macromolecular substance.

12. A method for spin-dyeing natural, regenerated, or artificial fibers comprising applying a dye composition containing a metal complex pigment according to claim 1 to a natural, regenerated, or artificial fiber during the fiber spinning process.

13. A method for printing textiles or paper comprising applying a printing preparation containing a metal complex pigment according to claim 1 to a textile or paper.

* * * * *